(12) United States Patent
Patel et al.

(10) Patent No.: US 10,977,410 B2
(45) Date of Patent: Apr. 13, 2021

(54) IC ROUTING FOR SILICON CIRCUITS WITH SMALLER GEOMETRIES

(71) Applicant: Fungible, Inc., Santa Clara, CA (US)

(72) Inventors: Vijaykumar I. Patel, Fremont, CA (US); Bharat K. Bisen, Fremont, CA (US)

(73) Assignee: Fungible, Inc., Santa Clara, CA (US)

( * ) Notice: Subject to any disclaimer, the term of this patent is extended or adjusted under 35 U.S.C. 154(b) by 0 days.

(21) Appl. No.: 16/810,624

(22) Filed: Mar. 5, 2020

(65) Prior Publication Data

US 2020/0334406 A1 Oct. 22, 2020

Related U.S. Application Data

(60) Provisional application No. 62/834,688, filed on Apr. 16, 2019.

(51) Int. Cl.
*G06F 30/392* (2020.01)
*G06F 30/394* (2020.01)

(52) U.S. Cl.
CPC .......... *G06F 30/392* (2020.01); *G06F 30/394* (2020.01)

(58) Field of Classification Search
USPC ........................................................ 716/118
See application file for complete search history.

(56) References Cited

U.S. PATENT DOCUMENTS

| 5,583,788 | A  | 12/1996 | Kuribayashi |
| 8,239,807 | B2 | 8/2012  | Arora et al. |
| 8,806,414 | B2 | 8/2014  | Huang et al. |
| 2010/0050140 | A1 | 2/2010 | Chang et al. |
| 2019/0205493 | A1 | 7/2019 | Garibay et al. |

FOREIGN PATENT DOCUMENTS

WO   1996/024904 A1   8/1996

OTHER PUBLICATIONS

"Standard Cell," Wikipedia, the Free Encyclopedia, last edit Oct. 18, 2018, accessed on Mar. 18, 2019, 3 pp.
Kim et al., "Physical Design of CMOS Integrated Circuits," accessed from https://www.eecs.wsu.edu/~ee434/Handouts/04-Physical_Design.pdf on or about Mar. 18, 2019, 45 pp.
Kister, "Floorplanning complex SoCs with multiple levels of physical hierarchy," posted online Feb. 22, 2016, accessed from https://www.techdesignforums.com/practice/technique/floor-planning-complex-socs-with-multiple-levels-of-physical-hierarchy/, 3 pp.

(Continued)

*Primary Examiner* — Mohammed Alam
(74) *Attorney, Agent, or Firm* — Shumaker & Sieffert, P.A (57) ABSTRACT

A switch box approach to routing interconnects during the design of an integrated circuit (IC). Processing circuitry (e.g., via an automation tool) may determine a manner in which to interconnect functional blocks of the IC. The signal routes that interconnect the functional blocks can become complicated to comply with design rules for latency, crosstalk, etc. The processing circuitry may divide channels between functional blocks into multiple interconnection blocks, called channel blocks. In this way, the channel blocks may be considered as another block type (e.g., interconnection block) that the processing circuitry can leverage for routing signals between functional blocks.

16 Claims, 5 Drawing Sheets

(56) References Cited

OTHER PUBLICATIONS

Kogge, "VLSI Circuit Layout: Standard Cells," Introduction to CMOS VLSI Design, Fall 2015-2018, accessed from https://www3.nd.edu/~kogge/courses/cse40462-VLSI-fa18/www/Public/Lectures/StandardCell.pdf, on or about Mar. 18, 2019, 15 pp.
Lee, "An automated routing method for VLSI with three interconnection layers," Dissertation from Iowa State University, 1986, retrieved from https://lib.dr.iastate.edu/cgi/viewcontent.cgi?referer=https://www.google.com/&httpsredir=1&article=9091&context=rtd on or about Jan. 25, 2019, 103 pp.
Teman, "Lecture 4: Standard Cell Libraries," Digital VLSI Design, Nov. 27, 2016, accessed from http://www.eng.biu.ac.il/temanad/files/2017/02/Lecture-4-Standard-Cell-Libraries.pdf, 32 pp.
Young, "IC layout must avoid crosstalk problems," EE Times, accessed from https://www.eetimes.com/document.asp?doc_id=1277678 on Mar. 18, 2019, 2 pp.
International Search Report and Written Opinion of International Application No. PCT/US2020/021249, dated Jul. 28, 2020, 17 pp.
Chen et al., "LOPASS: A Low-Power Architectural Synthesis System for FPGAs With Interconnect Estimation and Optimization," IEEE Transactions on Very Large Scale Integration (VLSI) Systems, vol. 18, No. 4, Apr. 1, 2010, pp. 564-577.
Tsai et al., "Network on Chips: Structure and Design Methodologies," Journal of Electrical and Computer Engineering, vol. 2012, Jan. 1, 2012, 16 pp.

IC ROUTING FOR SILICON CIRCUITS WITH SMALLER GEOMETRIES

This application claims the benefit of U.S. Provisional Patent Application 62/834,688, filed Apr. 16, 2019, the entire content of which is incorporated herein by reference.

TECHNICAL FIELD

The disclosure relates to integrated circuit (IC) design and routing.

BACKGROUND

With the shrinking size of IC technology and increase in design complexity, the silicon chip design is becoming more complicated and runtime intensive. Many ICs, such as system on a chip (SoC) are made of billions of transistors. To simplify the physical chip design process, a hierarchical floorplan approach may be used in which a chip design is divided into multiple blocks of manageable size. Even after dividing chip in multiple blocks, there may be a large number of interconnects between these blocks. Routing these interconnects may present a challenge as part of the physical chip design.

SUMMARY

In general, the disclosure is directed to techniques for a switch box approach to routing interconnects during the design of an integrated circuit (IC). For example, processing circuitry (e.g., via execution of an automation tool) may determine a manner in which to interconnect functional blocks (e.g., independent circuit blocks that perform different functions) of the IC. The signal routes that interconnect the functional blocks can become complicated to comply with design rules for latency, crosstalk, etc. For example, there may be limits to the length of the routing paths or the number of vias the routing paths can intersect to ensure that the fidelity of the signal carried by the routing paths is maintained.

In accordance with techniques described in this disclosure, the processing circuitry may divide channels between functional blocks into multiple interconnection blocks, called channel blocks in this disclosure. In this way, the channel blocks may be considered as another block type (e.g., interconnection block) that the processing circuitry can leverage for routing signals between functional blocks.

In this disclosure the term "signal path" is intended to mean a path through a channel block, which may include one or more buffers, flip flops or other components. The term "signal path" generically include data/control/test/clock interconnect between functional blocks. The term "signal route" is intended to indicate a series of one or more signal paths between a functional block and, for example another functional block, through one or more channel blocks. As with signal path, the term signal route may generically include a route for data or control or test or clock interconnect to a functional block through one or more channel blocks. A signal route may also be referred to as a "net."

Each channel block may be assigned, as a block, for each net in the design for routing. A channel blocks may include a predetermined layout of buffers, repeater flip flops, signal paths, power paths, ground paths and vias to connect between layers within the IC chip through which a net traverses. The channel blocks may be abutted to each other and abutted to the functional blocks, which may also be referred to as functional blocks in this disclosure. In other words, the full-chip channel may be divided into many smaller channel blocks.

During routing, an electronic design automation tool may need to only consider the interconnections between each channel block and a functional block or another channel block, rather than the full-chip channel routing. Electronic design automation (EDA), also referred to as electronic computer-aided design (ECAD), is a category of software tools for designing electronic systems such as integrated circuits and printed circuit boards. By making interconnections between blocks, rather than full-chip routing, the EDA tool may complete the routing with significantly reduced run-time and reduce the chances of convergence issues.

In one example, the disclosure is directed to a method comprising: arranging, with processing circuitry, a plurality of functional blocks according to an integrated circuit (IC) floor plan, wherein the floor plan includes channels between the plurality of functional blocks and dividing, with processing circuitry, the channels into a plurality of channel blocks. The processing circuitry may further assign connection features to each channel block of the plurality of channel blocks and arranging, with processing circuitry, a first channel block of the plurality of channel blocks such that the first channel block abuts at least a first functional block and at least a second channel block of the plurality of channel blocks; generating, with processing circuitry, a first plurality of connections between the first functional block and the first channel block; generating, with processing circuitry, a second plurality of connections between the first channel block and the second channel block; generating, with processing circuitry, a third plurality of connections between the second channel block and a second functional block. The first functional block includes a connection to the second functional block via the first channel block and the second channel block.

In another example, the disclosure is directed to system comprising: a display system and processing circuitry configured to: determine characteristics of functional blocks in library; arrange a plurality of functional blocks according to an integrated circuit (IC) floor plan, wherein the floor plan includes channels between the plurality of functional blocks; divide the channels into a plurality of channel blocks and assign connection features to each channel block of the plurality of channel blocks. The processing circuitry may be further configured to arrange a first channel block of the plurality of channel blocks such that the first channel block abuts at least a first functional block and at least a second channel block of the plurality of channel blocks; generate a first plurality of connections between the first functional block and the first channel block; generate a second plurality of connections between the first channel block and the second channel block; generate a third plurality of connections between the second channel block and a second functional block, wherein the first functional block includes a connection to the second functional block via the first channel block and the second channel block, and finally output a display of the connections to the display system.

The details of one or more examples of the disclosure are set forth in the accompanying drawings and the description below. Other features, objects, and advantages of the disclosure will be apparent from the description and drawings, and from the claims.

DETAILED DESCRIPTION

The switch box approach to routing interconnects, as described in this disclosure, during the design of an integrated circuit (IC) may reduce the routing length for signal routes and reduce routing complexity, thereby reducing computing power and time required for routing. For example, processing circuitry (e.g., via execution of an automation tool) may determine a manner in which to interconnect functional blocks (e.g., independent circuit blocks that perform different functions) of the IC. The signal routes that interconnect the functional blocks can become complicated to comply with design rules for latency, crosstalk, etc. For example, there may be limits to the length of the routing paths or the number of vias the routing paths can intersect to ensure that the fidelity of the signal carried by the routing paths is maintained.

In accordance with techniques described in this disclosure, the processing circuitry may divide channels between functional blocks into multiple interconnection blocks, called channel blocks. Each channel block may be assigned, as a block, for each net in the design for routing. The channel blocks may be abutted to each other and abutted to the functional blocks. That is, the full-chip channel may be divided into many smaller channel blocks. Channel blocks may be populated with a predetermined layout of buffers, repeater flip flops, signal path, power paths, ground paths and vias to connect between layers, based on, for example, a variety of design rules and standardized channel block layouts. In this way, the channel blocks may be considered as another block type (e.g., interconnection block) that the processing circuitry can leverage for routing signals between functional blocks.

During routing, the EDA tool may need to only consider the interconnections between each channel block and a functional block or another channel block, rather than the full-chip channel routing for the nets on the IC. The EDA tool may determine a signal route, for example, between two functional blocks, by selecting connections to existing signal paths, buffers, flip-flops, etc. within one or more channel blocks laid out between the functional blocks. By making interconnections between blocks, rather than full-chip routing, the EDA tool may complete the routing with significantly reduced run-time and reduce the chances of convergence issues. Once the design converges in the EDA tool and the design is finalized, the design file may be transferred to a foundry to create the physical form of the IC.

Figure 1:
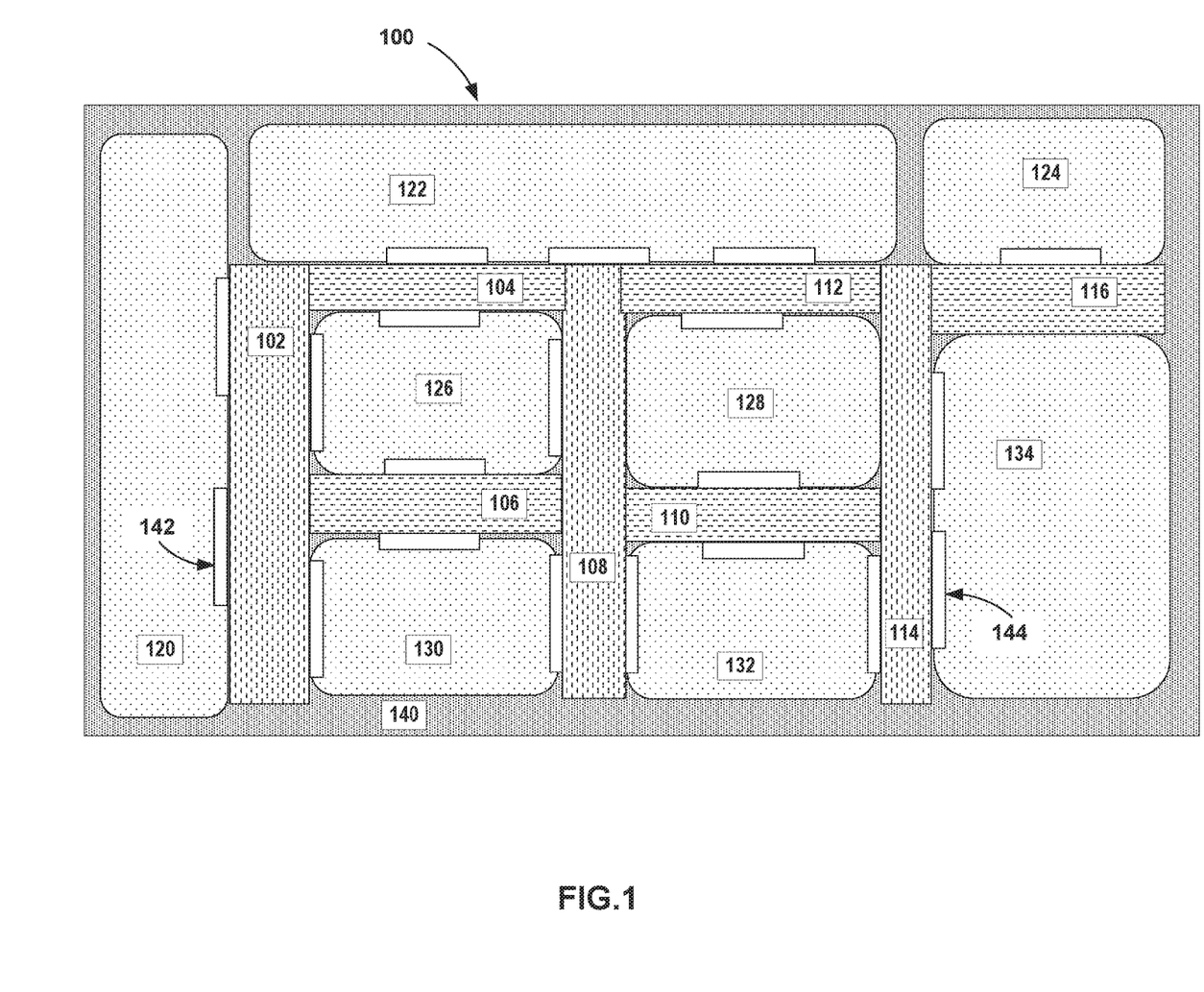
FIG. 1 is a block diagram illustrating a high performance IC, which includes functional blocks and channel blocks according to one or more techniques of this disclosure.

FIG. 1 is a block diagram illustrating a high performance integrated circuit (IC), which includes functional blocks and channel blocks according to one or more techniques of this disclosure. When complete, the physical form of IC 100 may include a complex arrangement of billions of transistors, networks, channels, and interconnections. Examples of IC 100 may include a very large scale integration (VLSI) system on a chip (SOC) IC, a microprocessor, a field programmable gate array (FPGA), a graphics processing unit (GPU), high speed complementary metal oxide silicon (CMOS) technology and other similar circuits.

In the example of FIG. 1, IC 100 includes functional blocks (or IP-blocks) 120, 122, 124, 126, 128, 130, 132, and 134, which may be arranged on the base silicon, i.e. die 140. Examples of functional blocks 120-134 (collectively functional blocks) may include any block of logic, data, or other circuitry, that perform as a functional block and may be re-used in other designs. In some examples a functional block may be referred to as a hierarchical block or a multi-instantiated block. Some examples of functional blocks may include input/output (I/O) devices such as universal asynchronous receiver/transmitter (UART), ethernet controllers, universal serial bus (USB) and PCI interfaces. Other examples of functional blocks may include central processing units (CPU), logic, memory, datapaths for more complex arithmetic, logic gates, digital signal processors (DSP) and similar examples. functional blocks may be of different types including hard, firm (or semi-hard) and soft. A hard functional block may be fully described and measurable, but less portable and flexible than the other two types. A firm functional block may be somewhat configurable to various applications. A soft functional block may be described by a netlist, i.e. a list of the logic gates and interconnections that make up the IP-core, similar to the netlist describing the interconnections and functional blocks of IC 100. In other examples a soft functional block may be described in hardware description language (HDL) code.

Each functional block may include one or more sets of connections, such as terminals 142 on functional block 120 and terminals 144 on functional block 134. FIG. 1 depicts the channels between the functional blocks as divided into channel blocks 102, 104, 106, 108, 110, 112, 114, and 116. In other examples, IC 100 may include more or fewer functional blocks and more or fewer channel blocks. In some examples, IC 100 may include a combination of channel blocks and routing channels that are not a channel block (not shown in FIG. 1).

Channel blocks 102, 104, 106, 108, 110, 112, 114, and 116 (collectively channel blocks) are circuit blocks that provide a way for functional blocks to be interconnected and from the perspective of the EDA tool appear as a block rather than a series of interconnection paths. Therefore, the EDA tool does not need to determine the entire signal route between functional blocks through the channels. Instead the EDA tool may only need to consider the connections between functional blocks and the channel blocks, and the channel blocks with other channel blocks. In this way, the routing computation complexity may be significantly and therefore improve the run-time, as well as validation, troubleshooting and steps in the IC design process.

The channel blocks may be sized and arranged in the floorplan such that the channel blocks are abutted to other channel blocks and the functional blocks. In the example of FIG. 1, the channel blocks are depicted as rectilinear. However, in other examples, other shapes for channel blocks may be feasible. An advantage of a rectilinear channel block may be that routes through the channel block have limited or no turns. In some examples, the edges of the channel blocks may have labeled edges to be used for interconnections between other channel blocks and functional blocks. For example, set edge (106) $\{106_l, 106_t, 106_r, 106_b\}$ may indicate, respectively a left edge of channel block 106, a top edge of channel block 106, a right edge of channel block 106, and a bottom edge of channel block 106, as depicted in FIG. 1. In some examples, channel blocks may be standardized and re-used, similar to multi-instantiated functional blocks.

The terminals on IC 100, such as terminals 142 and 144, may include tens of hundreds of pins (i.e. terminals or connections) or more. In the example of FIG. 1, the terminals provide the connections between the functional blocks and the channel or channel block that abut the terminals in the functional block.

In operation, the techniques of this disclosure for generating a design may include, selecting the functional blocks to be used to perform the overall functions of IC 100, e.g. I/O blocks, processing circuitry, memory and so on. In some examples, selecting the functional blocks may include determining characteristics of the functional blocks in a library of components which include functional blocks.

A design system (e.g., EDA tool as one example, but the techniques are not so limited) may arrange the functional blocks blocks according to an IC floor plan, in which the floor plan includes channels between the plurality of functional blocks to be used for routing interconnections. In some examples the arrangement of the functional blocks may be accomplished by a set of design rules and desired performance characteristics. In some examples, a human operator may adjust the floor plan or other aspects of the design as arranged by the design system. In some examples the library may include information about the pinout for the terminals of each functional block. In other examples, the design system may change or create terminals in locations according to the arrangement of the floorplan.

The design system may divide the channels between the functional blocks into multiple channel blocks, e.g. channel blocks 102, and 110. As described above, each channel block may include signal paths, buffers and other components needed to connect one functional block to another functional block. Depending on the function, signal paths may be of different sizes and characteristics. For example, construction rules may describe characteristics such as widths, layers, and the pitches to be used for a given signal path.

The signal routes between functional blocks may be determined in several steps, for example by first determining which channel block should connect to an adjacent abutted functional block. Next, the design system may determine the connections between each functional block and an adjacent, abutted channel block best suited for a particular signal route. Determining the connections and the appropriate channel blocks may be based on design goals such as transition, timing, signal-EM (electro-migration), IR-drop (Power Supply drop), DRCs (design rule checks) and other IC sign-off targets. In some examples, a human operator may review and make adjustments to the signal routes determined by the design system.

As described above, "signal path" is intended to mean a path through a channel block, which may include one or more buffers, flip flops or other components. The term "signal route" is intended to indicate a series of one or more signal paths between a functional block and, for example another functional block, through one or more channel blocks. A signal route may also be referred to as a "net."

In some examples, the signal route for a particular signal may be based on the shortest available route between the first functional block, e.g. functional block 120 and a second functional block, e.g. functional block 134 based on available connection features in the channel blocks between functional block 120 and functional block 134, e.g. channel blocks 102, 106, 108, 110 and 114. In some examples, higher priority signals may be determined by the design system before lower priority signals. Lower priority signals may be determined based on which connection features are still available in the intervening channel blocks. In some examples, signal routes may include not only signals between functional blocks, but also signal routes to power, ground, or to terminals carrying signals into or out of IC 100.

Based on the determined signal routes, the design system may execute one or more procedures to feedthrough signal routes via signal paths within the selected channel block for each signal route. After the feedthrough step, each block in IC 100, i.e. each channel block and each functional block, may be interconnected to the adjacent abutted block. In some examples, terminals for a channel block may be created next to the abutted adjacent functional block. For example, terminals may be created in channel block 114, right side to connect to terminals 144 of functional block 134. Similarly, terminals may be created in channel block 112 top side to connect to functional block 122 and bottom side of channel block 112 to connect to functional block 128. Additional terminals may be created in other channel blocks to connect to other functional blocks.

Finally, the design system may create terminals between adjacent channel blocks, such as between channel block 108 left side and channel block 106 as well as channel block 104. In some examples, the routing length may be approximately zero for each connection between adjacent channel blocks, e.g. between channel block 114 right side and channel block 116 left side. Approximately zero means zero within tolerances for an IC technology standard and pitch distance. Physical design implementation for channel blocks may be like any functional blocks, except that arrangement, placement, clock tree synthesis (CTS), routing and other IC sign-off activities may be simpler and take less time because of the smaller size of a channel block compared to other types of functional blocks on IC 100.

The above example routing steps are just one example operation for the techniques of this disclosure. In other examples, some steps may be rearranged in order and other steps inserted or deleted. The techniques of this disclosure may provide advantages over other techniques for IC layout and routing. That is, by using multiple, small and manageable channel blocks to route signals between functional blocks, and between functional blocks may overcome several disadvantages of full-chip routing. For example, the complexity, runtime requirements for and EDA system and the and timing/physical verification convergence issues may be significantly reduced by sub-dividing the approach to routing signals. The techniques of this disclosure may also be considered a switch box based routing and repeating technique. In this disclosure, "repeating" means the addition of buffering or flip-flop on long signal nets, one or more time along the signal route to maintain the signal integrity and to meet the timing requirement.

The routing runtime may be improved over other techniques because the techniques of this disclosure may reduce the memory foot-print of the EDA system by dividing the channels between functional blocks into smaller channel blocks. Reduced runtime during the routing step may result in faster turn-around time for a design, as well as improved predictability and repeatability. For example, if routing needs to be re-run after a simulation or other event that causes a design change and an engineering change order (ECO).

Figure 2:
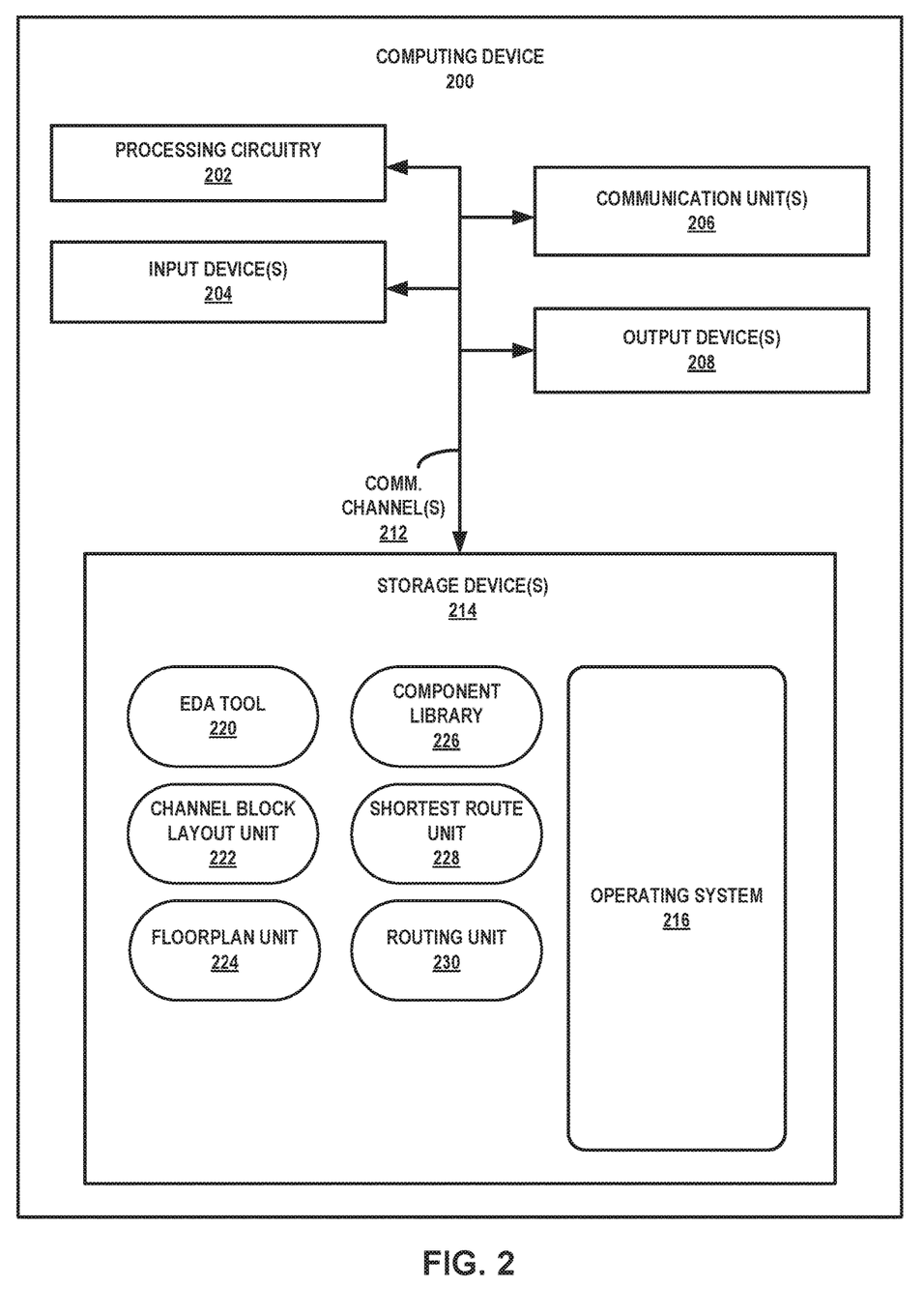
FIG. 2 is a block diagram illustrating an example computing device that may implement the one or more techniques of this disclosure.

FIG. 2 is a block diagram illustrating an example computing device that may implement the one or more techniques of this disclosure. Computing device 200 may be an example of a computing system that may include a design system as described above in relation to FIG. 1.

As shown in the example of FIG. 2, computing device 200 may include processing circuitry 202, one or more input devices 204, one or more communication units 206, one or more output devices 208, and one or more storage devices 214 and communication channels 212. In other examples, computing device 200 may include fewer, additional, or different components than those illustrated in FIG. 2. Communication channels 212 may interconnect each of the components 202, 204, 206, 208, and 214 for inter-component communications (physically, communicatively, and/or operatively). In some examples, communication channels 212 may include a system bus, a network connection, an inter-process communication data structure, or any other method for communicating data.

One or more input devices 204 of computing device 200 may receive input. Examples of input are tactile, audio, and video input. Input devices 204 of computing device 200, in one example, may include a presence-sensitive display, touch-sensitive screen, mouse, keyboard, voice responsive system, video camera, microphone or any other type of device for detecting input from a human or machine.

One or more output devices 208 of computing device 200 may generate output. Examples of output are tactile, audio, and video output. Output devices 208 of computing device 200, in one example, include a presence-sensitive display, sound card, video graphics adapter card, speaker, cathode ray tube (CRT) monitor, liquid crystal display (LCD), or any other type of device for generating output to a human or machine.

One or more communication units 206 of computing device 200 may communicate with wired or wireless external devices via one or more networks by transmitting and/or receiving network signals on the one or more networks. For example, computing device 200 may use communication unit 206 to transmit and/or receive radio signals on a radio network such as a cellular radio network. Examples of communication unit 206 include a network interface card (e.g. such as an Ethernet card), an optical transceiver, a radio frequency transceiver, a GPS receiver, or any other type of device that can send and/or receive information. Other examples of communication units 206 may include Bluetooth®, GPS, 3G, 4G, and Wi-Fi® radios found in mobile devices as well as Universal Serial Bus (USB) controllers. In other words, computing device 200 may be connected to a network (not shown in FIG. 2) via communication units 206.

The one or more storage devices 214 within computing device 200 may store information for use during operation of computing device 200. In this example, storage devices 214 of computing device 200 may include operating system (OS) 216. Storage devices 214 may include instructions, that when executed by processing circuitry 202 may perform the functions of a design system as described above in relation to FIG. 1. In the example of FIG. 2, a design system may include a variety of components, including EDA tool 220, channel block layout unit 222, floorplan unit 224, block connection unit 228 and routing unit 230. In some examples, floorplan unit 224, routing unit 230, and other components may be part of EDA tool 220.

Storage devices 214 may also include component library 226, which is an example of the library of components described above in relation to FIG. 1. In some examples, component library 226, or other component libraries may be accessible to computing device 200 via a network connection.

Storage devices 214, in some examples, may have the primary purpose of being short term as well as long-term computer-readable storage mediums. Storage devices 214 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 214 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 214 may store program instructions and/or data associated with process orchestrator 450, utilization detection and tracking unit 454, computing jobs tracker unit 452 and process engine selector unit 456.

Processing circuitry 202 may implement functionality and/or execute instructions within computing device 200. For example, processing circuitry 202 on computing device 200 may read and execute instructions stored by storage devices 214 that execute the functionality of computing device 200. Examples of processing circuitry 202 may include any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry.

Various components of programming instructions stored in memory device 214 may perform IC layout and routing, similar to the process for the design system described above in relation to FIG. 1. In some examples, programming instructions may include one or more scripts. For example, floorplan unit 224, along with other programming instructions, may select functional blocks and arrange the functional blocks in a floorplan, with sufficient channel between the placed functional blocks for routing needs. In some examples, the functional blocks may be selected from component library 226. In some examples, floorplan unit 224 may create pins or terminals for all the functional blocks, as described above in relation to FIG. 1.

Channel block layout unit 222 may create multiple channel blocks from the available channels created by floorplan unit 224, e.g. channel blocks 102, 114, and 116 depicted in FIG. 1. Channel block layout unit 222 may size and place the channel blocks in the floorplan so that the channel blocks are abutted to other channel blocks and functional blocks as shown in FIG. 1. In some examples, channel block layout unit 222 and floorplan unit 224 may exchange data and other information to complete the floorplan and channel block layout.

Routing unit 230 may determine for each net (aka signal route) at a top level, through which channel blocks that net should be routed. Routing unit 230 and shortest route unit 228 may exchange data or other information to determine the shortest signal route based on the priority for the signal.

As one example, shortest route unit 228, for each net, may select the channel block or channel blocks for net feedthrough to route the net between a source terminal and a target terminal. In some examples the source terminal (S)

and target terminal (T) may be on separate functional blocks. For example, the source terminal (S) may be one of terminals 142 on functional block 120, while the target terminal (T) may be one of terminals 144 on functional block 134.

As described above in relation to FIG. 1, shortest route unit 228 may label edges of all the channel blocks. Based on the arrangement of the channel blocks and the location of the channel block edges, shortest route unit 228 may prepare a table for adjacent channel block edges for each channel block edge. For example, referring to the example of FIG. 1:

set adjacent($114_R$) {$116_L$}
    set adjacent($106_L$) {$102_R$}
    set adjacent($108r$) {$112l$ $110l$}
    Etc.

Shortest route unit 228 may store the prepared table at storage devices 214.

In some examples, shortest route unit 228 may also prepare a table with edge locations and store the edge location table at storage devices 214, for example:

| | |
|---|---|
| set location($114_R116_L$) {x1 y1} | set location($116_L114_R$) {x1 y1} |
| set location($106_L102_R$) {x2 y2} | set location {$102_R106_L$} {x2 y2} |
| Etc. | |

For each net, shortest route unit 228 may identify the source terminal (S) of the selected net and its location, e.g. (S) {xs ys} as well as identify the target terminal (T) of the selected net and its location, e.g. (T) {xt yt}. For example, in FIG. 1, the source terminal may be in terminals 142 and the target terminal may be in terminals 144.

Shortest route unit 228 may determine the source terminal adjacent channel block, e.g. channel block 102, and determine the target terminal adjacent channel block, e.g 114. Shortest route unit 228 may look for a signal route between source and destination channel block is present in a signal route lookup table. In some examples, the selected net may not be available in the route lookup table, e.g. the selected net may be a lower priority net and higher priority nets may have consumed the available routes. Therefore, shortest route unit 228 may determine find all possible path from S to T, such that the same channel block does not appear more than once in the route. Shortest route unit 228, may, for example loop through all the edges of source block (e.g. functional block 120 depicted in FIG. 1), and then loop through the channel blocks adjacent to functional block 120, in this example channel block 102. Shortest route unit 228 may then loop through adjacent edges of channel block 102, a channel blocks adjacent to channel block 102, e.g. channel block 104 and channel block 106. Shortest route unit 228 may continue to loop through adjacent edges and adjacent blocks until all the possible routes to destination channel block, e.g. functional block 134, is found. In some examples, shortest route unit 228 may remove a channel block that has already appeared in the link, from returned result to avoid net looping through same channel block multiple times.

After finding all the possible routes, shortest route unit 228 may calculate the distance for each route. In some examples, shortest route unit 228 may calculate the Manhattan distance for all the results using the location table prepared as described above. The Manhattan distance function computes the distance that would be traveled to get from one data point to the other if a grid-like path is followed. The Manhattan distance between two items is the sum of the differences of their corresponding components, as compared to a Euclidean distance, which is the distance directly between two points. In other examples, the Euclidean distance may be computed from the square root of the sum of the squares of the differences between corresponding values. In some examples, shortest route unit 228 may store all the possible routes between a selected source and target channel blocks and the associated route length in the path lookup table, e.g. stored in memory 214. This reduces run time by preventing repeated calculation for any other net whose source terminal is on an edge of channel block is 102 and whose destination terminal is on an edge of channel block 114. Shortest route unit 228 may repeat the process for other source terminals and target terminals for other nets to be used on the IC.

Once shortest route unit 228 determines the channel blocks for a selected net, routing unit 230 may run the procedure to feedthrough the selected net through the selected channel blocks. In some examples, shortest route unit 228 and routing unit 230 may be part of EDA tool 220.

Also, in some examples a rectilinear channel block may be considered to have more than four edges. For example, merging channel blocks 114 and 116 depicted in FIG. 1 may result in an inverted L shaped 114 with 6 edges e.g $114_L$, $114_T$, $114_{R1}$ $114_{B1}$, $114_{R2}$, $114_{B2}$.

As described above in relation to FIG. 1, after the selected net has a feedthrough the selected channel blocks, all blocks (IP-blocks and channel blocks) may be connected only to an adjacent block. EDA tool 220, or some other component of the design system, may create terminals for channel blocks adjacent to functional blocks. Channel blocks and functional blocks get connected by abutment. EDA tool 220 may create terminals between any two channel blocks along the net on the abutted edge of each channel block. Once complete, the top level is fully routed.

In this manner, the techniques of this disclosure may provide advantages in runtime improvements during arrangement and routing, as well as design checks, approval and sign-off activities. Other advantages may include relieving congestion at the block level and result in faster block convergence as well as full chip convergence predictability. Also, these techniques may prevent expensive top-layer routing resources from being wasted, so functional blocks can use top-layer routing resources for routing timing critical nets. This approach may also improve reusability of any multi-instantiated blocks.

Figure 3:
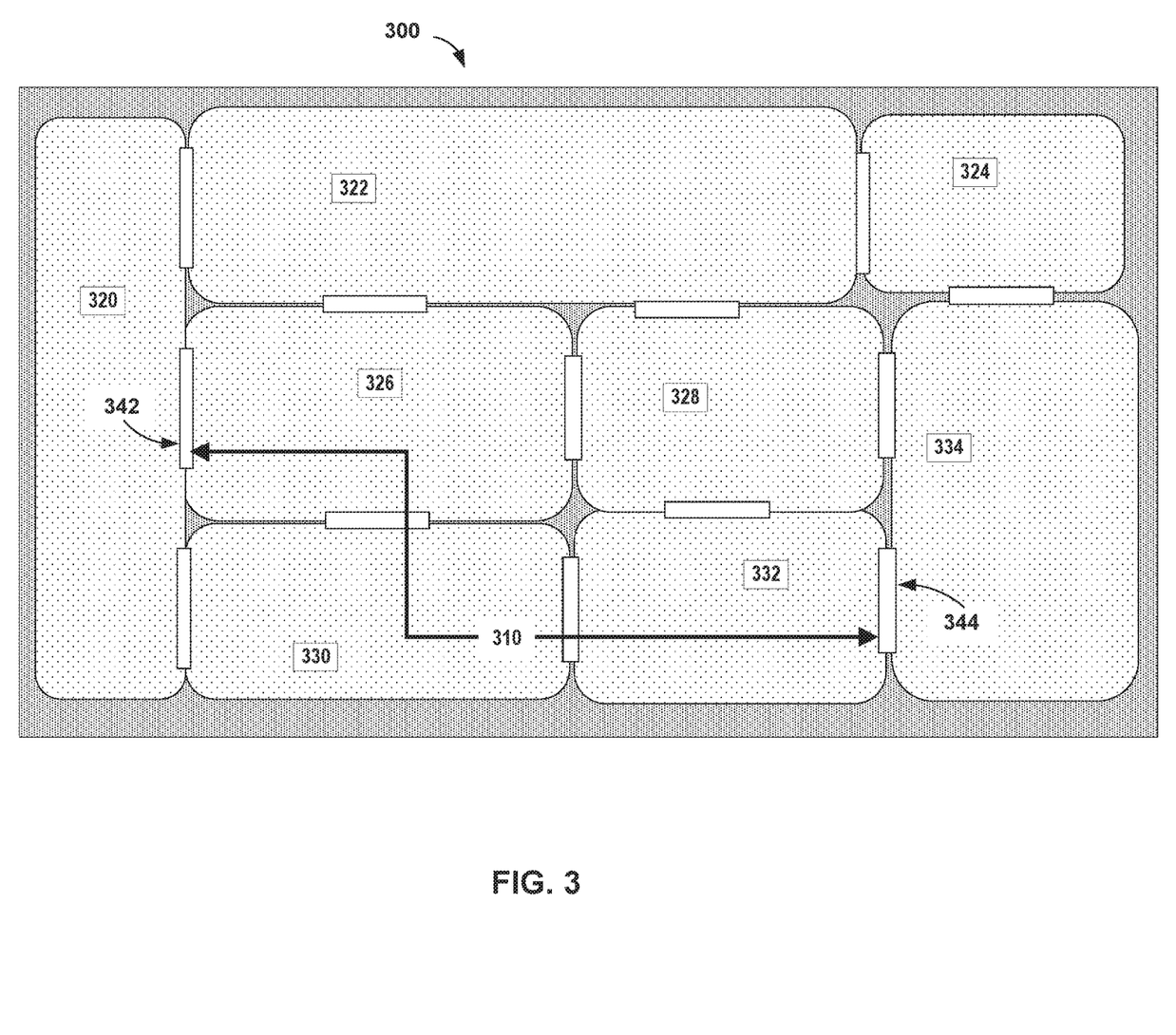
FIG. 3 is a block diagram illustrating an example of abutted block floorplan with feedthrough pushdown.

FIG. 3 is a block diagram illustrating an example of abutted block floorplan with feedthrough pushdown. IC 300 may be any complex integrated circuit, such as an SOC or similar circuit as described above in relation to FIG. 1.

Similar to the example of FIG. 1, IC 300 includes functional blocks (or IP-blocks) 320, 322, 324, 326, 328, 330, 332, and 334. Each functional block may include one or more sets of connections, such as terminals 342 on functional block 320 and terminals 344 depicted on functional block 334. Each functional block in the example of IC 300 is connected to one or more other functional blocks on the chip. In an abutted block floorplan the nets, e.g. signal route 310, between two non-adjacent blocks are feed-through other blocks in the path. In this approach the block with feedthrough nets will have both feedthrough nets and ports for all the nets routed through it. At the top level of IC 300 there is no channel needed because all nets are feed-through the functional blocks. Feedthrough nets routing, buffering, signal-integrity and all sign-off requirements are at block level.

An abutted block floor plan may include several advantages over other types of layouts. For example, a channel is not needed at the full-chip level and full-chip interconnects are distributed in multiple blocks as a feedthrough and sign-off along with blocks other logic. Therefore, the full-chip sign-off may be becomes much easier and faster for an abutted floorplan that for other examples.

An abutted floorplan may also have several disadvantages when compared to the techniques of this disclosure described above in relation to FIGS. 1 and 2. For example, multi-instantiated block reusability may become difficult because multi-instantiated blocks may need to be made unique to help in congestion/timing closure. This may limit the reusability of multi-instantiated block design effort may be greater than when compared to the techniques of this disclosure.

Other disadvantages may include that a functional block needs to open and available for any functional/timing changes related to the full-chip net which is feed-through it. This may limit the usability of a hard or firm type functional block. Also, feedthrough nets and any buffering associated with the net may consumes a functional block's routing and placement resource. Sometime blocks closure may become difficult and may consume more area on the IC to close the block due to additional feedthrough signals.

Figure 4:
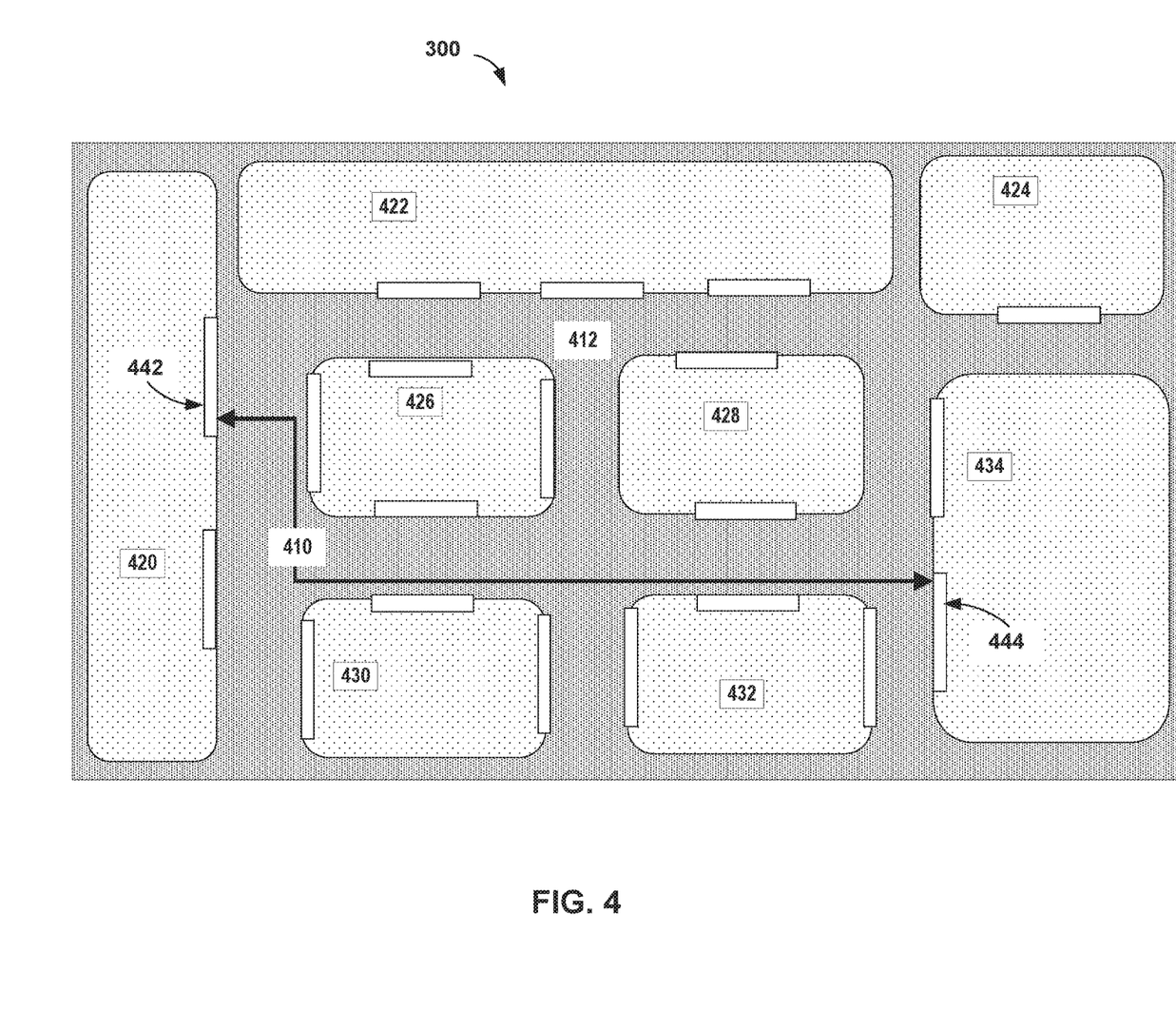
FIG. 4 is a block diagram illustrating an example channel-based floorplan and routing approach.

FIG. 4 is a block diagram illustrating an example channel-based floorplan and routing approach. IC 400 may be any complex integrated circuit as described above in relation to FIG. 1.

Similar to the example of FIG. 1, example IC 400 includes functional blocks (or functional blocks) 420, 422, 424, 426, 428, 430, 432, and 434. Each functional block may include one or more sets of connections, such as terminals 442 on functional block 420 and terminals 444 depicted on functional block 434. FIG. 4 depicts channel 412 between the functional blocks.

The functional blocks/hierarchical-blocks of IC 400, as with IC 100 and IC 300, may include tens of hundreds of pins in each side. Each functional block may be connected to one or more other functional blocks on the chip. In channel-based routing approach of IC 400, the nets that make the connections, such as signal route 410 may be routed in the channel 412 between the functional blocks. An EDA tools and design system, such as EDA tool 220 described above in relation to FIG. 2 may be used to make sure that the nets on IC 400 meet all the design goals, such as transitions, timing, signal-EM, IR-drop, DRCs and other chip sign-off targets similar to those described above in relation to FIG. 1.

Some advantages of the channel-based routing approach, when compared to other approaches may include that functional block routing resource may avoid being used by full-chip nets. Closure for individual functional blocks may be easier, when compared to the abutted approach described above in relation to FIG. 3 because, for example functional blocks may be closed with lesser area with better timing. Also, hard or firm type IP-Block may not need to be modified for any full-chip related timing/functional changes and multi-instantiated blocks can be fully reused.

The channel based routing approach may also have several disadvantages, including that the number of instances for signal routes at full-chip can become very large after buffering the interconnect nets. Consequently arrangement, CTS (Clock Tree Synthesis), net routing, implementation, extraction, STA (Static Timing Analysis) and physical-verification may be very runtime intensive. Also, small timing or functional changes resulting in an ECO (Engineering Change Order) may become bottle neck because all the sign-off checks may need to run again and therefore will take additional time.

Figure 5:
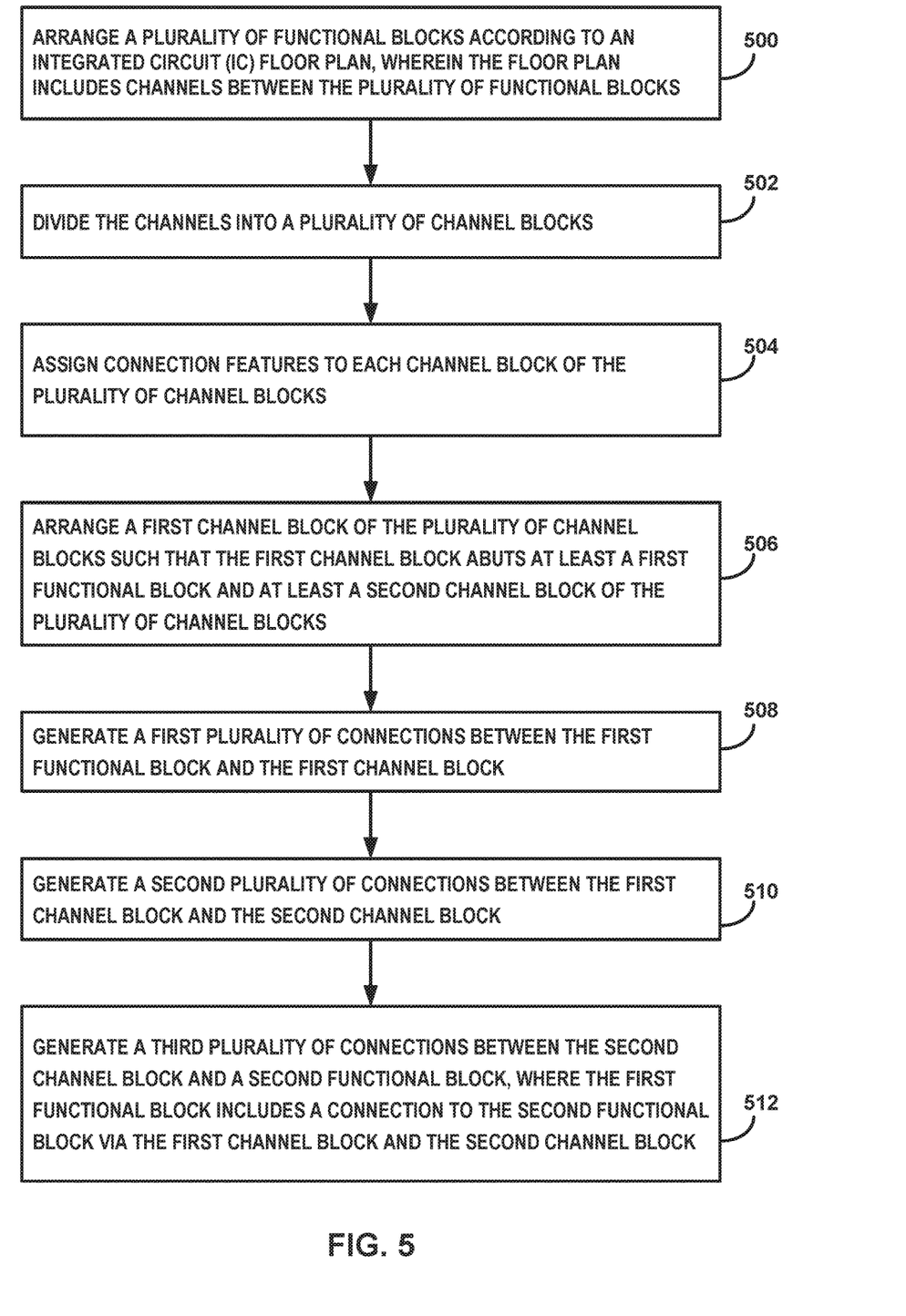
FIG. 5 is a flow chart illustrating an example operation of a system executing the techniques of this disclosure.

FIG. 5 is a flow chart illustrating an example mode of operation for the switch box channel block routing techniques of this disclosure. The steps of FIG. 5 will be explained in terms of FIGS. 1 and 2 unless otherwise noted. In some examples, the steps of FIG. 5 may be performed in a different order than described below. Also, the techniques of this disclosure may omit steps or include other steps not shown in FIG. 5.

During IC layout, a design system of this disclosure may arrange a plurality of functional blocks according to IC floor plan (500). The arrangement of the IC floor plan may be based on several factors such as design rules, timing and power requirements, distance from functional blocks to external terminals on an IC, such as IC 100. The floor plan may include channels between the plurality of functional blocks.

The design system, which may include several components, including EDA tools 220 and component library 226, may divide the channels into a plurality of channel blocks (502). Channel blocks may be rectilinear, such as channel blocks 102 and 108 depicted in FIG. 1, or may be other shape as appropriate for the layout Channel blocks may include signal paths, buffers to boost signal power for longer signal routes as well as other connection features. The design system may assign connection features to each channel block of the plurality of channel blocks (504).

The design system, which may operate on a computing device, such as computing device 200 depicted in FIG. 2, may arrange a first channel block of the plurality of channel blocks such that the first channel block abuts at least a first functional block and at least a second channel block of the plurality of channel blocks (506). In this manner the routing distance between blocks (functional blocks to channel blocks and channel blocks to other channel blocks) may be short, e.g. approximately zero, similar to a routing length that may be found in IC 300 described above in relation to FIG. 3.

The design system may generate a first plurality of connections between the first functional block and the first channel block (508). Some examples of connections may include terminals 142 and 144. Connections at the edges of functional blocks may be source terminals or target terminals, as described above in relation to FIG. 2.

The design system may generate a second plurality of connections between the first channel block and the second channel block (510). As described above in relation to FIG. 2, the design system, e.g. via EDA tools 220, routing unit 230 and shortest route unit 228 may continue to generate connections between adjacent channel blocks and functional blocks.

The design system may provide additional connections between the second, or additional channel block and a second functional block, i.e. a target terminal on a second functional block. Once the feedthrough process is complete, the first functional block may include a connection to the second functional block via the first channel block and the second channel block and any intervening channel blocks (512). After generating the signal route, or net, between the first functional block and the second functional block, the design system may decrementing by one a first count of connection features in the first channel block used in generating the signal route and decrementing by one a second count of connection features in the second channel block used in generating the signal route, as well as decrementing the count of any signal paths through the channel blocks.

The design system may repeat the process for the remaining connections between functional blocks and/or to input or output terminals for the IC.

Various examples of the disclosure have been described. These and other examples are within the scope of the following claims.

The invention claimed is:

1. A method comprising:
arranging, with processing circuitry, a plurality of functional blocks according to an integrated circuit (IC) floor plan, wherein the floor plan includes channels between the plurality of functional blocks;
dividing, with processing circuitry, the channels into a plurality of channel blocks;
assigning, with processing circuitry, connection features to each channel block of the plurality of channel blocks;
arranging, with processing circuitry, a first channel block of the plurality of channel blocks such that the first channel block abuts at least a first functional block and at least a second channel block of the plurality of channel blocks;
generating, with processing circuitry, a first plurality of connections between the first functional block and the first channel block;
generating, with processing circuitry, a second plurality of connections between the first channel block and the second channel block;
generating, with processing circuitry, a third plurality of connections between the second channel block and a second functional block, wherein:
the first functional block includes a connection to the second functional block via the first channel block and the second channel block.

2. The method of claim 1, wherein the connection features include one or more of: a buffer, a flip-flop, a signal path, a power path and a via.

3. The method of claim 1, further comprising determining, a count of connection features included in each channel block of the plurality of channel blocks.

4. The method of claim 1, wherein a routing length is approximately zero for each connection of:
the first plurality of connections between the first functional block and the first channel block;
the second plurality of connections between the first channel block and the second channel block; and
the third plurality of connections between the second channel block and a second functional block.

5. The method of claim 1, wherein:
each channel block of the plurality of channel blocks comprises a plurality of layers, and
each layer of the plurality of layers comprises one or more connection features assigned to each channel block of the plurality of channel blocks.

6. The method of claim 1, wherein generating the first plurality of connections, the second plurality of connections and the third plurality of connections comprises generating a signal route between the first functional block and the second functional block.

7. The method of claim 6, wherein in response to generating the signal route:
decrementing by one a first count of connection features in the first channel block used in generating the signal route; and
decrementing by one a second count of connection features in the second channel block used in generating the signal route.

8. The method of claim 6, wherein the generated signal route comprises the shortest available route between the first functional block and the second functional block based on:
available connection features in the first channel block and the second channel block; and
design rules that apply to the generated signal route; and
priority rules that apply to the generated signal route.

9. A system comprising:
a display system; and
processing circuitry configured to:
determine characteristics of functional blocks in library;
arrange a plurality of functional blocks according to an integrated circuit (IC) floor plan, wherein the floor plan includes channels between the plurality of functional blocks;
divide the channels into a plurality of channel blocks;
assign connection features to each channel block of the plurality of channel blocks;
arrange a first channel block of the plurality of channel blocks such that the first channel block abuts at least a first functional block and at least a second channel block of the plurality of channel blocks;
generate a first plurality of connections between the first functional block and the first channel block;
generate a second plurality of connections between the first channel block and the second channel block;
generate a third plurality of connections between the second channel block and a second functional block, wherein the first functional block includes a connection to the second functional block via the first channel block and the second channel block; and
output a display of the connections to the display system.

10. The system of claim 9, wherein the connection features include one or more of: a buffer, a flip-flop, a signal path, a power path and a via.

11. The system of claim 9, wherein the processing circuitry is further configured to determine a count of connection features included in each channel block of the plurality of channel blocks.

12. The system of claim 9, wherein a routing length is approximately zero for each connection of:
the first plurality of connections between the first functional block and the first channel block;
the second plurality of connections between the first channel block and the second channel block; and
the third plurality of connections between the second channel block and a second functional block.

13. The system of claim 9, wherein:
each channel block of the plurality of channel blocks comprises a plurality of layers, and
each layer of the plurality of layers comprises one or more connection features assigned to each channel block of the plurality of channel blocks.

14. The system of any claim 9, wherein to generate the first plurality of connections, the second plurality of connections and the third plurality of connections comprises creating a signal route between the first functional block and the second functional block.

15. The system of claim 14, wherein in response to the generated the signal route the processing circuitry is further configured to:
decrement by one a first count of connection features in the first channel block used in the generated signal route; and decrement by one a second count of connection features in the second channel block used the generated signal route.

16. The system of claim 14, wherein the generated signal route comprises the shortest available route between the first functional block and the second functional block based on:
    available connection features in the first channel block and the second channel block; and
    design rules that apply to the generated signal route; and
    priority rules that apply to the generated signal route.

* * * * *